United States Patent [19]

Giulie

[11] Patent Number: 4,633,324
[45] Date of Patent: Dec. 30, 1986

[54] CRT SHIELD

[76] Inventor: James E. Giulie, 150 Commercial St., Sunnyvale, Calif. 94086

[21] Appl. No.: 694,036

[22] Filed: Jan. 23, 1985

[51] Int. Cl.$^4$ .............................................. H04N 5/64
[52] U.S. Cl. ................................... 358/255; 358/252; D14/84; 353/97
[58] Field of Search .............. 358/252, 255, 247, 249, 358/245, 254; D14/84; 220/2.1 A, 2.3 A; 160/61, 84 R, 133, DIG. 7; 353/97

[56] References Cited

U.S. PATENT DOCUMENTS 2,670,792  3/1954  Del Rio ................................... 160/61
2,737,649  3/1956  Pifer ...................................... 358/254

FOREIGN PATENT DOCUMENTS 563971  6/1957  Italy ..................................... 358/255

*Primary Examiner*—John W. Shepperd
*Assistant Examiner*—John K. Peng

[57] ABSTRACT

An adjustable shield is provided which fits over the cabinet of a CRT to help eliminate glare on the screen and also serves as a security shield. The shield is made of a series of thin solid members, which run at a right angle to the face of the tube, with a flexible member holding the strips in assembled relationship so that a standard shield can be adjusted to fit a number of different sizes and shapes of CRT enclosures.

1 Claim, 3 Drawing Figures

CRT SHIELD

SUMMARY OF THE INVENTION

CRT readouts are very common in many applications such as word processors, T.V., computers, oscilloscopes, monitors or the like. Such CRTs are ordinarily enclosed in a cabinet so that the face of the tube is not protected from ambient light as from overhead light fixtures or windows at the side. This glare is highly undesirable and is tiring on the operator. The present invention provides a shield which extends along the top and sides of the CRT. This serves to not only reduce glare but also serves as security shield since in many applications confidential code numbers may appear on the screen and it is not desired that bystanders be able to read the numbers.

The shield of the present invention is flexible so that it will conform to a wide variety of CRT cabinets which may differ in size and shape. Thus, the device of the present invention can be used with the smallest to the largest cabinets.

Since the CRT shield of the present invention is flexible, it can be stored and shipped in a minimum of space.

Other features and advantages of the invention will appear in the balance of the specification.

DESCRIPTION OF THE PREFERRED EMBODIMENTS

Figure 1:
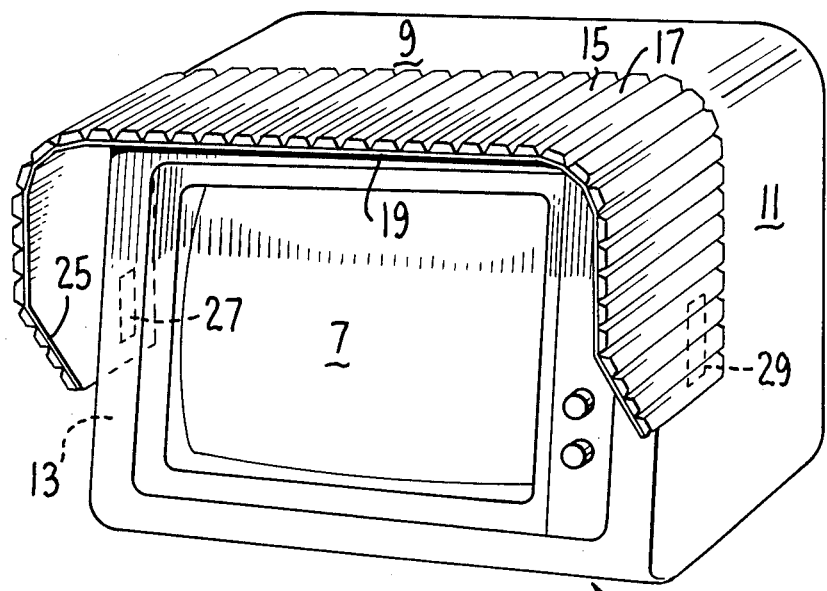
FIG. 1 is a perspective view of a CRT terminal showing a shield embodying the present invention in place.
Figure 2:
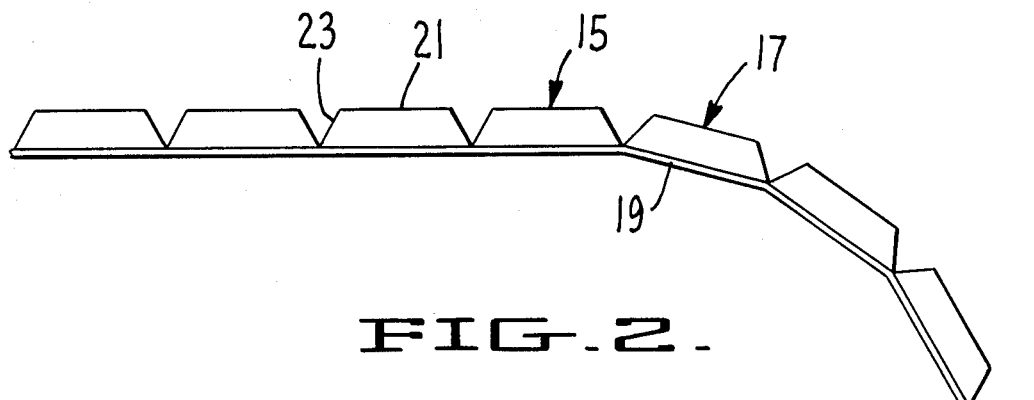
FIG. 2 is an enlarged partial side view of the shield of the present invention.

Referring now to the drawings by reference characters, there is shown a terminal generally designated 5. The terminal has a CRT 7 and is housed in a cabinet having a top 9 and ends 11 and 13. The shield proper is composed of a plurality of strips, such as those designated 15 and 17 held together by a flexible backing material 19 which may be fabric, paper or other material. Normally, the strips are made of commercial material having sloping sides so that the strip can be bent in either direction. However, this is not necessary in the present application since the shield is always bent in a convex configuration with the strips out and the flexible material to the center. A very attractive effect may be achieved by having the tops 21 of one color and the incut sides 23 of a contrasting color. Normally the lower front portion of the shield is cut back as is shown at 25. Ordinarily, it is not necessary to fasten the shield to the cabinet of the CRT, but if this is desired, one can employ pressure sensitive tapes as at 27 and 29. Preferably, the tapes are of the dual locking peel and press type which allow for easy placement and removal for servicing.

Figure 3:
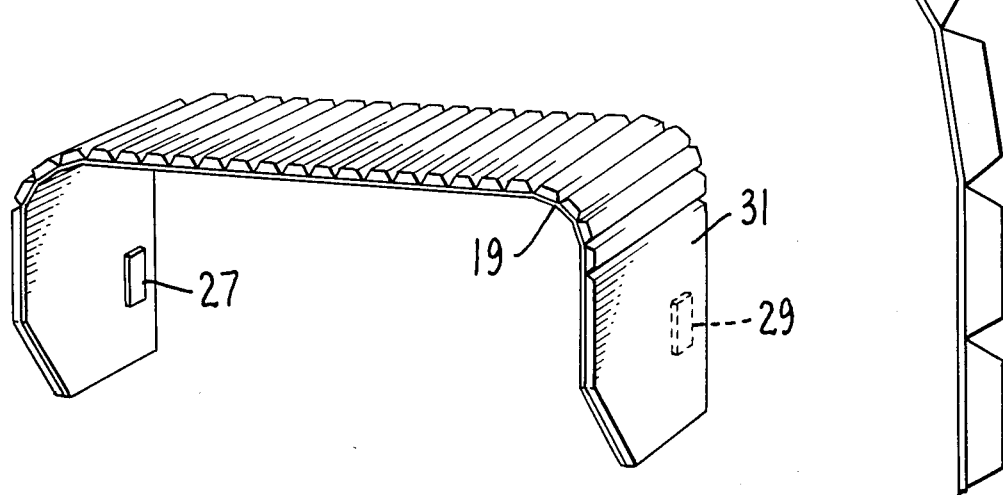
FIG. 3 is a perspective view of another embodiment of the shield.

The entire shield can be made up of relatively narrow strips held together with flexible material as is shown in FIG. 1 or the ends may be solid as is shown at 31 in FIG. 3. Thus, it is not necessary that the entire shield be made up of narrow strips, but the ends can be made of solid material with the narrow strips over the top and corners. Of course, one could also make the top of a solid material with flexible strips only at the corners.

The strips, such as 15 and 17, can be of any solid material, such as wood, metal or plastic. The flexible material inbetween which has been designated 19 can be any material capable of holding the strips in alignment and permitting bending, such as cloth, thin plastic or even heavy paper. Many variations can be made in the structure shown without departing from the spirit of this invention.

I claim:

1. An adjustable light shield for a CRT in an enclosure, comprising in combination:
   a. a plurality of thin strips lying side by side in parallel relationship, said strips being made of a solid material and lying at right angles to the face of a CRT, and extending lengthwise out past the face of said CRT;
   b. a flexible material holding said strips in alignment and permitting said plurality of strips to bend about the longitudinal axis of said strips so that said strips will conform to and lie against virtually any surface in which said CRT is enclosed and whereby said shield can be rolled up for storage,
   c. said strips covering the top and both sides of said enclosure.

* * * * *